United States Patent
Kim et al.

(10) Patent No.: US 11,260,703 B2
(45) Date of Patent: Mar. 1, 2022

(54) PNEUMATIC TIRE WITH REINFORCEMENT MATERIAL

(71) Applicant: HANKOOK TIRE & TECHNOLOGY CO., LTD, Seoul (KR)

(72) Inventors: Sol Kim, Daejeon (KR); Kyung Min Yun, Daejeon (KR); Chang Hyo Hong, Daejeon (KR)

(73) Assignee: HANKOOK TIRE & TECHNOLOGY CO., LTD, Seoul (KR)

( * ) Notice: Subject to any disclaimer, the term of this patent is extended or adjusted under 35 U.S.C. 154(b) by 16 days.

(21) Appl. No.: 16/676,535

(22) Filed: Nov. 7, 2019

(65) Prior Publication Data

US 2020/0324582 A1 Oct. 15, 2020

(30) Foreign Application Priority Data

Apr. 15, 2019 (KR) .......................... 10-2019-0043508

(51) Int. Cl.
*B60C 15/00* (2006.01)
*B60C 15/06* (2006.01)

(52) U.S. Cl.
CPC ...... *B60C 15/0628* (2013.01); *B60C 15/0009* (2013.01); *B60C 15/0027* (2013.01); *B60C 2015/065* (2013.01); *B60C 2015/0692* (2013.01)

(58) Field of Classification Search
CPC ............ B60C 15/0009; B60C 15/0018; B60C 15/0027; B60C 15/0628; B60C 15/0603; B60C 2015/009; B60C 2015/065; B60C 2015/061

USPC ......................................................... 152/554
See application file for complete search history.

(56) References Cited

U.S. PATENT DOCUMENTS

| | | | | |
|---|---|---|---|---|
| 4,024,901 A | * | 5/1977 | Poque | B60C 15/0018 152/541 |
| 5,656,108 A | * | 8/1997 | Sakamoto | B60C 9/04 152/454 |
| 6,253,816 B1 | * | 7/2001 | Ide | B60C 9/22 152/527 |

FOREIGN PATENT DOCUMENTS

| | | | | |
|---|---|---|---|---|
| JP | 08300913 A | * | 11/1996 | |
| JP | 09048219 A | * | 2/1997 | |
| JP | 09188112 A | * | 7/1997 | ......... B60C 15/0607 |
| JP | 2001219719 A | * | 8/2001 | |
| JP | 2007191044 A | * | 8/2007 | ......... B60C 15/0018 |

(Continued)

OTHER PUBLICATIONS

Machine Translation: JP-09048219-A, Yotsumoto, Toshihiro, (Year: 2021).*

(Continued)

*Primary Examiner* — Kendra Ly
(74) *Attorney, Agent, or Firm* — Novick, Kim & Lee, PLLC; Jae Youn Kim; Jihun Kim

(57) ABSTRACT

A pneumatic tire with a reinforcement material includes: a tread that comes in contact with a road surface; side walls that extend and form shoulders and inner liners at both sides of the tread; a carcass that is integrally attached to the tread and the inner sides of the side walls and forms a turn-up head at both ends of the side walls; a belt layer that is layered on the tread of the carcass; and a bead that includes a bead core inserted in a wheel inside the turn-up head, a bead filler inserted in a side of the tread of the bead core, and a reinforcement material inserted in an interface of the turn-up head.

5 Claims, 9 Drawing Sheets

(56) References Cited

FOREIGN PATENT DOCUMENTS

| JP | 2010036657 A | * | 2/2010 | |
|---|---|---|---|---|
| JP | 2010-143285 A | | 7/2010 | |
| JP | 2011084221 A | * | 4/2011 | ............. D07B 1/062 |
| JP | 5076322 B2 | | 11/2012 | |

OTHER PUBLICATIONS

Machine Translation: JP-2007191044-A, Akiyama, Ichiro, (Year: 2021).*
Machine Translation: JP-2001219719-A, Itoi, Yohei, (Year: 2021).*
Machine Translation: JP-09188112-A, Yamane, Kenji, (Year: 2021).*
Machine Translation: JP-2010036657-A, Ikuno, Toshifumi, (Year: 2021).*
Machine Translation: JP-2011084221-A, Ueda, Yoshio, (Year: 2021).*
Machine Translation: JP-08300913-A, Endo, Yukio, (Year: 2021).*

* cited by examiner

| ITEM | WEIGHT | | RR | | SED |
|---|---|---|---|---|---|
| MODEL No. 1 | REFERENCE | 13.1 kg | REFERENCE | 55N | 0.029 Mpa |

| ITEM | WEIGHT | | RR | | SED |
|---|---|---|---|---|---|
| MODEL No. 2 | ↑↑ | 13.2 kg | ↑↑ | 57N | 0.024 Mpa |

| ITEM | WEIGHT | | RR | | SED |
|---|---|---|---|---|---|
| MODEL No. 3 | ↑ | 13.1 kg | ↑ | 56N | 0.026 Mpa |

| ITEM | WEIGHT | | RR | | SED |
|---|---|---|---|---|---|
| MODEL No. 4 | REFERENCE | 11.8 kg | REFERENCE | 61N | 0.034 Mpa |

| ITEM | WEIGHT | | RR | | SED |
|---|---|---|---|---|---|
| MODEL No. 5 | ↑↑ | 12.0 kg | ↑↑ | 65N | 0.019 Mpa |

| ITEM | WEIGHT | | RR | | SED |
|---|---|---|---|---|---|
| MODEL No. 6 | ↑ | 11.8 kg | ↑ | 63N | 0.028 Mpa |

FIG. 13

PNEUMATIC TIRE WITH REINFORCEMENT MATERIAL

CROSS-REFERENCE TO RELATED APPLICATIONS

This application claims priority to KR 10-2019-0043508, filed Apr. 15, 2019, the disclosure of which is incorporated herein by reference in its entirety.

BACKGROUND OF THE INVENTION

Field of the Invention

The present invention relates to a pneumatic tire and, more particularly, to a pneumatic tire with a reinforcement material, the pneumatic tire improved in degree of freedom in design so that a reinforcement material can be applied to low-series tires with a low section height.

Description of the Related Art

With the tendency of high-inch of PCR (Passenger Car Radial) tires, it is required to improve the performance of low-series tires.

A steel reinforcement material that is one of plans for improving handling performance is impossible to apply to low-series tires because it is difficult to secure the spacing distance of the end point of the bead filler/carcass/steel reinforcement material in tires with a low section height (SH).

Further, there is a need for a design technology that sets the position of an end point in consideration of stress concentration at a carcass end point, and as a related art of the design technology, it has been disclosed to improve durability by positioning a carcass end point at a lower end of a bead wire of a multiple structure in Japanese Patent No. 8076322 (hereafter, referred to as 'Patent 322').

Further, in Japanese Patent Application Publication No. 2010-143285 (hereafter, referred to as 'Patent 285'), there has been disclosed a pneumatic tire configured such that the end point of a carcass layer and the end point of a member configuring a bead portion are disposed out of the range over 50% and less than 70% of a tire section height from an inside in the tire radial direction in a tire with a projection on a contact surface being in contact with a rim flange.

FIG. 1 is a view showing tensile and compression forces that are applied to a bead portion of a common tire.

In Patent 322 of the related art, as shown in FIG. 1, the end point of a carcass exists in the compression area of the bead portion, so a problem with durability still exists.

Further, Patent 285 of the related art cannot solve the problem that the position of the end point of a carcass has to be spaced because the section height of low-series tire is small, and there is a problem that it cannot be actually applied to low-series tires.

Accordingly, in the related art, a steel reinforcement material (SRFM) is disposed between interfaces of a carcass to secure desired handling performance and improve durability. FIG. 2 is a view showing a configuration in which a steel reinforcement material is disposed between interfaces of a carcass in the related art. However, this structure has a problem that the section C that is a section over a bead filler is excessively reinforced, so the weight of the entire tire increases and a rotational resistance performance is traded off. Further, it is difficult to set the section D in low-series tires, so it is required to space the end point of the carcass, which causes a problem with durability.

CITATION LIST

Patent Literature

Patent Literature 1: Japanese Patent No. 8076322
Patent Literature 2: Japanese Patent Application Publication No. 2010-143285

SUMMARY OF THE INVENTION

Accordingly, the present invention has been made in an effort to solve the problems in the related art, and an object of the present invention is to provide a pneumatic tire with a reinforcement material, the pneumatic tire having an improved structure increased in degree of freedom in design so that a reinforcement material can be easily applied to low-series tires with a low section height by making it easy to secure a spacing distance of end points of bead filler/carcass/steel reinforcement material.

In order to achieve the objects of the present invention, an embodiment of the present invention provides a pneumatic tire with a reinforcement material, the pneumatic tire including: a tread 100 that comes in contact with a road surface; side walls 200 that extend and form shoulders and inner liners 300 at both sides of the tread 100; a carcass 3 that is integrally attached to the tread 100 and the inner sides of the side walls 200 and forms a turn-up head 3c at both ends of the side walls 200; a belt layer 4 that is layered on the tread 100 of the carcass 3; and a bead P that includes a bead core 1 inserted in a wheel inside the turn-up head 3c, a bead filler 2 inserted in a side of the tread 100 of the bead core 1, and a reinforcement material 100 inserted in an interface of the turn-up head 3c, wherein the reinforcement material 10 is formed such that an end point 10a at the tread 100 of the reinforcement material 10 is spaced 5 mm to 10 mm apart from an end point 2a at the tread 100 of the bead filler 2 toward the tread 100.

An end point 10b at a wheel side of the reinforcement material 10 is positioned within the range of a bead core reinforcement side 1a of the bead core 1.

The reinforcement material 10 is a rolled product composed of steel wires that bends within a range of 15° C. to 45° C.

The carcass 3 is turned up to surround the bead core 1 and then the carcass end point 31 is positioned within the bead core reinforcement side 1a of the bead core 1.

The carcass 3 is configured such that an end including the carcass end point 31 and the reinforcement material 10 overlap each other by 5 mm to 7 mm.

The carcass 3 has a 2 ply structure in which a first carcass layer 3a at the wheel side and a second carcass layer 3a at the belt layer 4 are stacked. Further, a first carcass layer end point 3a1 of the first carcass layer 3a is turned up while surrounding the bead core 1 and is then positioned within the range of a bead core wheel side 1b.

A second carcass end point 3b1 of the second carcass layer 3b is turned up while surrounding the bead core 1 and is then positioned within the range of the bead core reinforcement material side 1a.

An end including the second carcass layer end point 3b1 of the second carcass layer 3b and the reinforcement material 10 overlap each other by 5 mm to 7 mm.

BRIEF DESCRIPTION OF THE DRAWINGS

FIG. 13 is an analysis result table showing characteristic/performance of a common 2 ply tire (225/45R17)(model No. 6 (M6) having a carcass turn-up head structure and an SRFM according to an embodiment of the present invention.

DETAILED DESCRIPTION OF THE PREFERRED EMBODIMENTS

Figure 1:
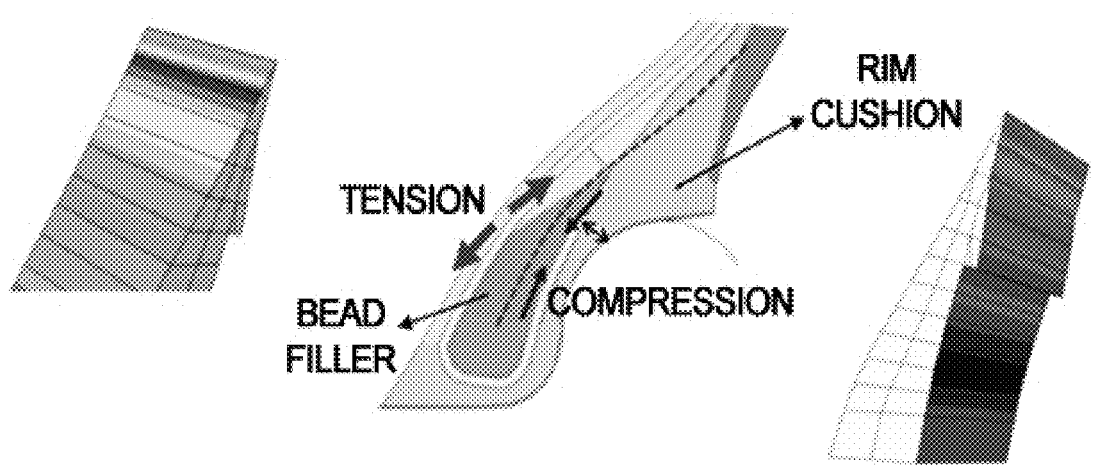
FIG. 1 is a view showing tensile and compression forces of a bead portion of a tire in the related art.
Figure 2:
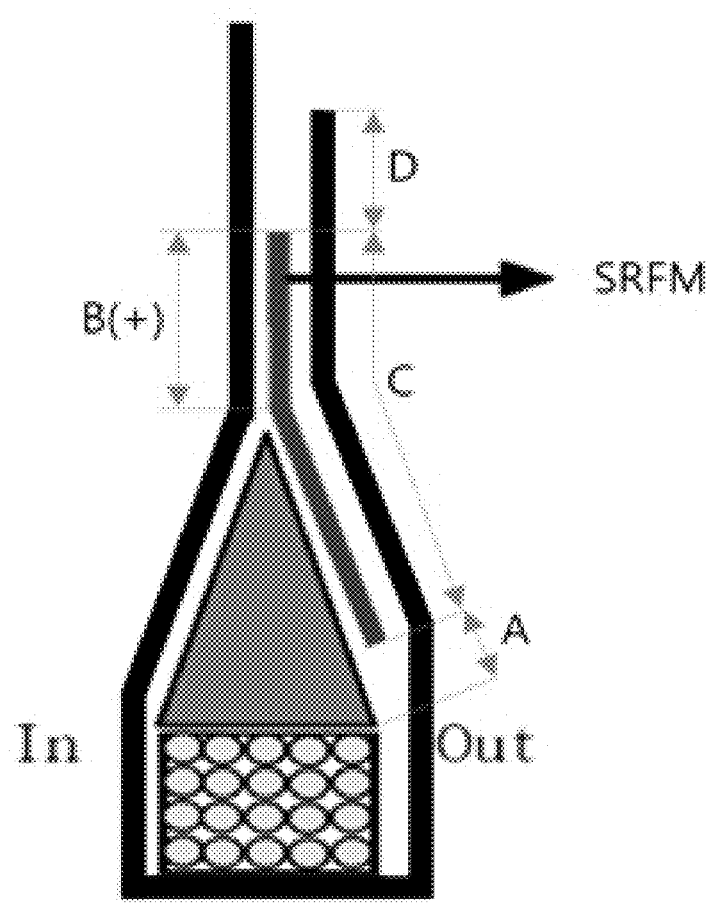
FIG. 2 is a view showing a configuration in which a steel reinforcement material is disposed between interfaces of a carcass in the related art.

In the following description of the present invention, detailed descriptions of well-known functions or configurations relating to the present invention will not be provided so as not to obscure the description of the present invention with unnecessary details.

Embodiments described herein may be changed in various ways and have various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It is to be understood that when one element is referred to as being "connected to" or "coupled to" other element, it may be connected directly to or coupled directly to the other element or be connected to or coupled to other element having another element intervening therebetween. On the other hand, it is to be understood that when one element is referred to as being "connected directly to" or "coupled directly to" other element, it may be connected to or coupled to the other element without another element intervening therebetween. Further, the terms used herein to describe a relationship between elements, that is, "between", "directly between", "adjacent" or "directly adjacent" should be interpreted in the same manner as those described above.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Hereafter, the present invention is described in detail with reference to the accompanying drawings showing an embodiment of the present invention.

Figure 3:
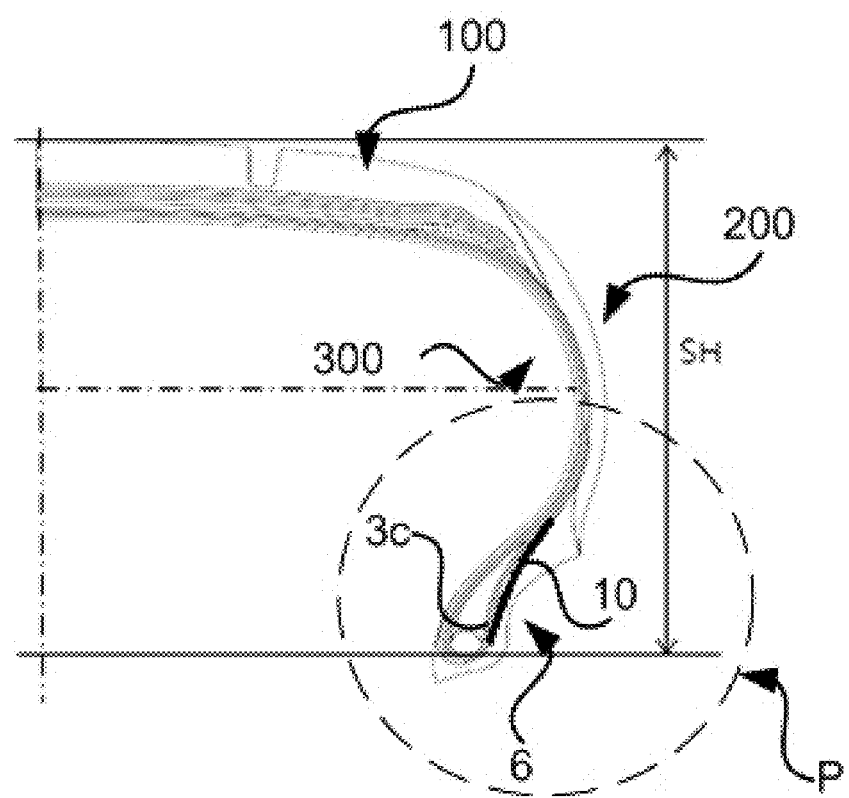
FIG. 3 is a cross-sectional view of a bead portion of a pneumatic tire with a reinforcement material according to an embodiment of the present invention.

FIG. 3 is a cross-sectional view of a bead of a pneumatic tire with a reinforcement material according to an embodiment of the present invention.

As shown in FIG. 3, a pneumatic tire of an embodiment of the present invention is a 1 Ply structure and includes: a tread 100 that comes in contact with a road surface; side walls 200 that extend and form shoulders and inner liners 300 at both sides of the tread 100; a carcass 3 that is integrally attached to the tread 100 and the inner sides of the side walls 200 and forms a turn-up head 3c at both ends of the side walls 200; a belt layer 4 that is layered on the tread 100 of the carcass 3; and a bead P that includes a bead core 1 inserted in a wheel inside the turn-up head 3c, a bead filler 2 inserted in a side of the tread 100 of the bead core 1, and a reinforcement material 10 inserted in an interface of the turn-up head 3c, in which the reinforcement material 10 is formed such that an end point 10a at the tread 100 of the reinforcement material 10 is spaced 5 mm to 10 mm apart from an end point 2a at the tread 100 of the bead filler 2 toward the tread 100. Further, an end point at the wheel of the reinforcement material 10 is positioned in the range of a bead core reinforcement side 1a of the bead core 1.

The reinforcement material 10 may be a rolled product composed of steel wires that bends within a range of 15° C. to 45° C., a carbon material, or plastic in consideration of the degree of contributing to handling rigidity.

Figure 4:
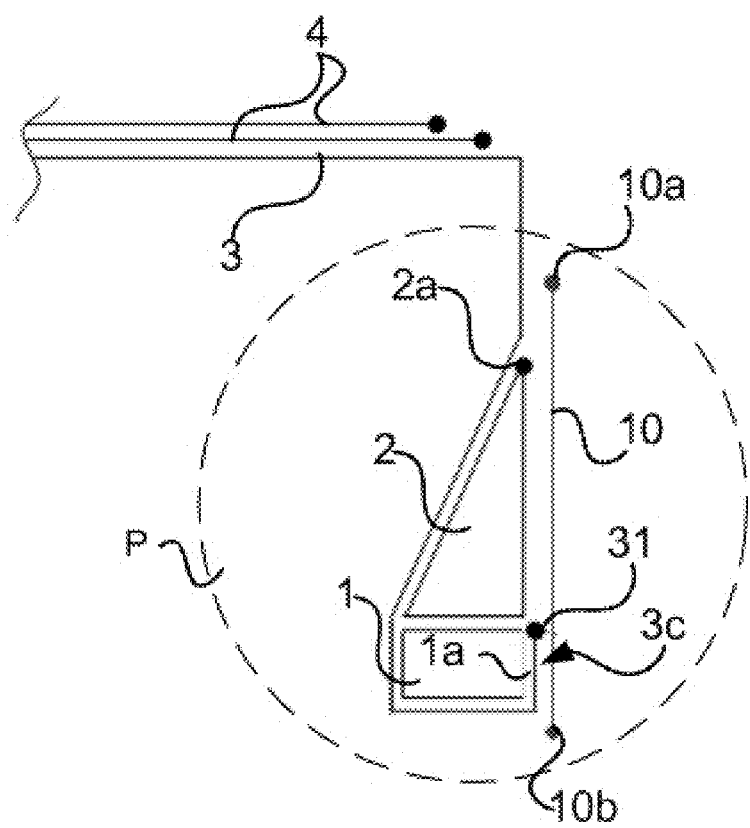
FIG. 4 is a view schematically showing the structure of a carcass and a steel reinforcement material of a bead portion of a 1 Ply structure tire according to an embodiment of the present invention.

FIG. 4 is a view schematically showing the structure of a carcass and a steel reinforcement material of a bead of a 1 Ply structure pneumatic tire according to an embodiment of the present invention.

The tire with a reinforcement material of an embodiment of the present invention that has the configuration described above, as shown in FIG. 4, may have a 1 ply structure.

In this case, the carcass 3 is turned up to surround the bead core 1 and then the carcass end point 31 is positioned within the bead core reinforcement side 1a of the bead core 1.

Further, the carcass 3 is configured such that an end including the carcass end point 31 and the reinforcement material 10 overlap each other by 5 mm to 7 mm.

Figures 5, 6:
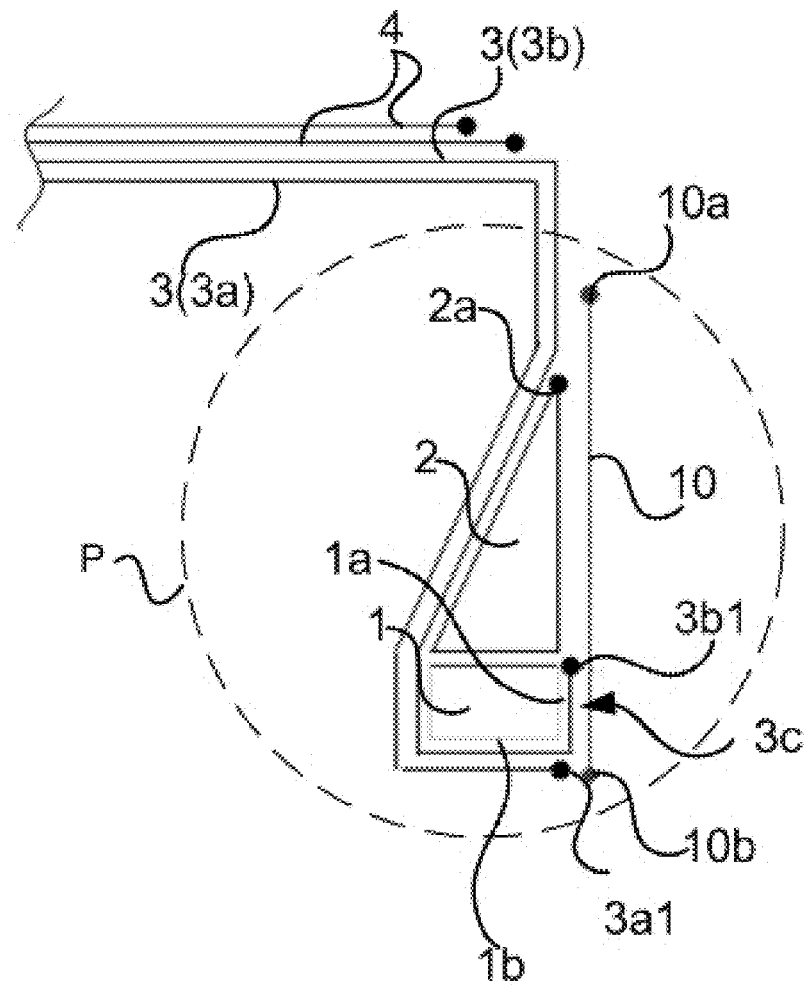
FIG. 5 is a view schematically showing the structure of a carcass and a steel reinforcement material of a bead portion of a 2 Ply structure tire according to an embodiment of the present invention.
FIG. 6 is a measurement table showing characteristic/performance of a common 2 ply tire (225/45R17)(model No. 1 (M1)).

FIG. 5 is a view schematically showing the structure of a carcass and a steel reinforcement material of a bead of a 2 Ply structure tire according to an embodiment of the present invention.

The pneumatic tire with a reinforcement material according to an embodiment of the present invention of FIG. 3 may have a 2 ply structure, as shown in FIG. 5.

In this case, the carcass 3 has a 2 ply structure in which a first carcass layer 3a at the wheel side and a second carcass layer 3a at the belt layer 4 are stacked. Further, a first carcass layer end point 3a1 of the first carcass layer 3a is turned up while surrounding the bead core 1 and is then positioned within the range of a bead core wheel side 1b.

A second carcass end point 3b1 of the second carcass layer 3b is turned up while surrounding the bead core 1 and is then positioned within the range of the bead core reinforcement material side 1a.

Further, an end including the second carcass layer end point 3b1 of the second carcass layer 3b and the reinforcement material 10 overlap each other by 5 mm to 7 mm.

A test for examining improvement of the degree of freedom in design, improvement of rotational resistance performance, and improvement of durability of the pneumatic tire of the present invention was performed.

Test Example

Test 1

Having size 225/45R17, a 2 ply pneumatic tire (model No. 1 (M1) of the related art, a 2 ply pneumatic tire (model No. 2 (M2)) in which a steel reinforcement material of the related art is inserted, and a 2 ply pneumatic tire (model No. 3 (M3)) having a carcass turn-up head structure and a reinforcement material structure according to an embodiment of the present invention were manufactured, and then strain energy density (SED), vertical rigidity of a tire (KV), and rotational direction rigidity (KD) were measured.

Figures 7, 8, 9:
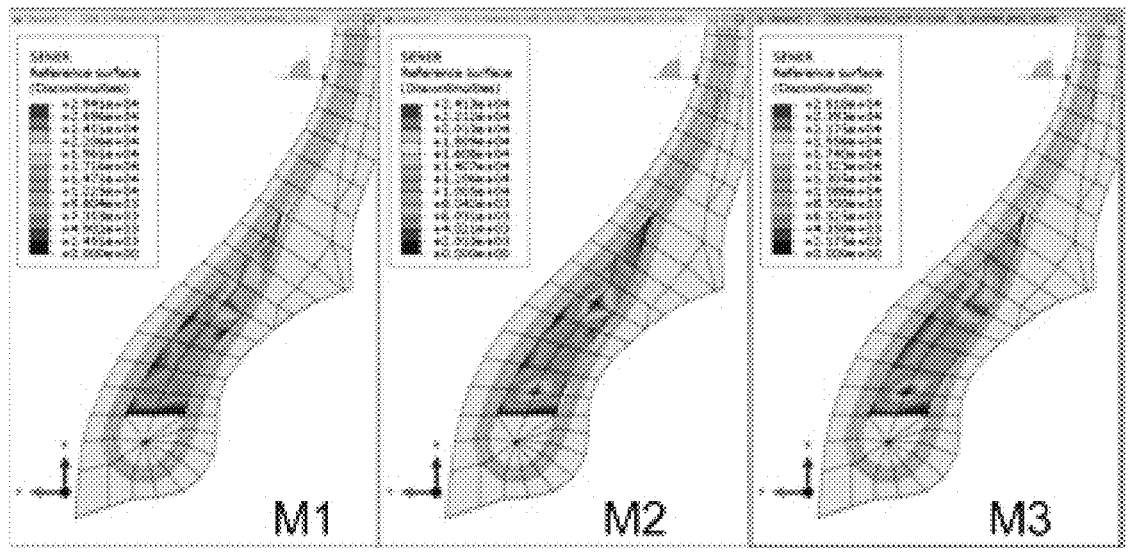
FIG. 7 is a analysis result table showing characteristic/performance of a common 2 ply tire (225/45R17) (model No. 2 (M2)) reinforced with an SRFM on a carcass interface.
FIG. 8 is a analysis result table showing characteristic/performance of a common 2 ply tire (225/45R17) (model No. 3 (M3)) having a carcass turn-up head structure and an SRFM according to an embodiment of the present invention.
FIG. 9 is a graph showing analysis pressure, energy, and rigidity distribution of models No. 1 to No. 3.
Figure 10A:
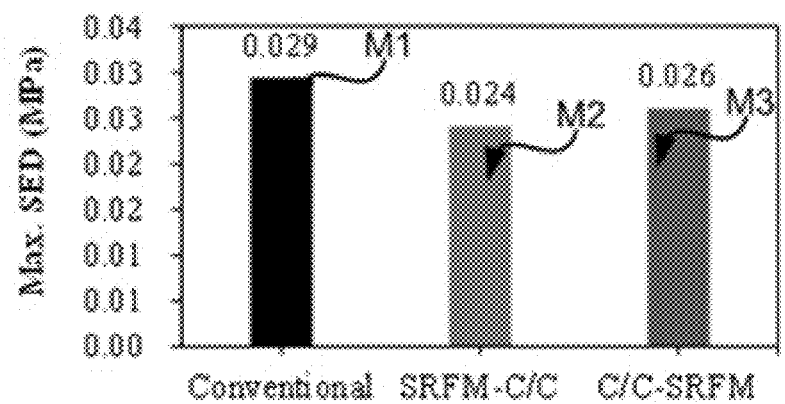
FIGS. 10A-10C are graphs comparing energy and rigidity of models No. 1 to No. 3.
Figure 10B:
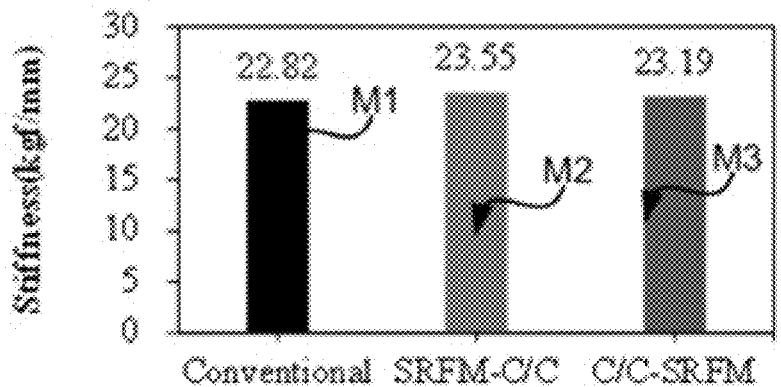
Figures 10C, 11, 12:
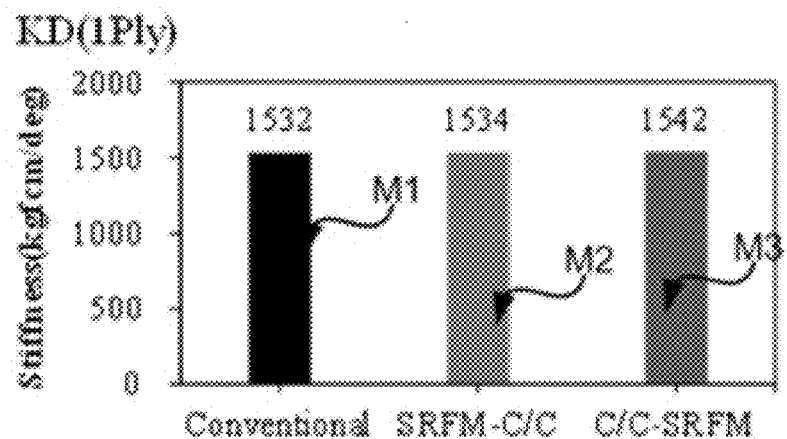
FIG. 11 is a measurement table showing characteristic/performance of a common 1 ply tire (225/45R17)(model No. 4 (M4).
FIG. 12 is an analysis result table showing characteristic/performance of a common 1 ply tire (225/45R17)(model No. 5 (M5) reinforced with an SRFM on a carcass interface.

FIG. 6 is a measurement table showing characteristic/performance of a common 2 ply pneumatic tire (225/45R17) (model No. 1 (M1)), FIG. 7 is a analysis result table showing characteristic/performance of a common 2 ply pneumatic tire (225/45R17) (model No. 2 (M2)) reinforced with an SRFM on a carcass interface, FIG. 8 is a analysis result table showing characteristic/performance of a common 2 ply tire (225/45R17) (model No. 3 (M3)) having a carcass turn-up head structure and an SRFM according to an embodiment of the present invention, FIG. 9 is a graph showing analysis pressure, energy, and rigidity distribution of models No. 1 to No. 3, and FIGS. 10A-10C are graphs comparing energy and rigidity of models No. 1 to No. 3.

As shown in FIGS. 6 to 10C, according to the model No. 2 that is a 2 ply structure of pneumatic tire without a reinforcement material, as described above in the related art, it can be seen that a section C that is a section over a bead filler is excessively reinforced, in which there is a problem that the weight of the entire tire is unnecessarily increased and the rotational resistance performance is traded off. Further, it can be seen that it is difficult to set the section D in low-series tires, so it is required to space the end point of the carcass and a problem is generated with durability, and accordingly, it cannot be applied to low-series tires. Further, even if applied, the weight of the pneumatic tire is increased, so the rotational resistance increases.

According the model No. 3 that is a pneumatic tire with a reinforcement material having a carcass turn-up head structure and a reinforcement material structure according to an embodiment of the present invention, weight and rotational resistance are minimized and durability (SED) is improved, resulting in improvement of riding comfort (KV, vertical rigidity) and traction (KD, rotational direction rigidity). Accordingly, it can be seen that the degree of freedom in design enabling application of a reinforcement material to low tires is improved, which makes it possible to manufacture a low-series pneumatic tire having a reinforcement material that improves rotational resistance performance, durability, riding comfort, and traction.

Test 2

Having size 225/45R17, a 1 ply pneumatic tire (model No. 4 (M4) of the related art, a 1 ply pneumatic tire (model No. 5 (M5)) in which a steel reinforcement material of the related art is inserted, and a 1 ply pneumatic tire (model No. 6 (M6)) having a carcass turn-up head structure and a reinforcement material structure according to an embodiment of the present invention were manufactured, and then strain energy density (SED), vertical rigidity of a tire (KV), and rotational direction rigidity (KD) were measured.

FIG. 11 is a measurement table showing characteristic/performance of a common 1 ply tire (225/45R17) (model No. 4 (M4)), FIG. 12 is a analysis result table showing characteristic/performance of a common 1 ply pneumatic tire (225/45R17) (model No. 5 (M5) reinforced with an SRFM on a carcass interface, and FIG. 13 is a analysis result table showing characteristic/performance of a common 2 ply pneumatic tire (225/45R17) (model No. 6 (M6) having a carcass turn-up head structure and an SRFM according to an embodiment of the present invention.

As shown in FIGS. 11 and 12, it can be seen the same improvement and tendency were shown when the present invention was applied to a 1 ply structure of pneumatic tire.

That is, according to the present invention, the degree of freedom in design is increased by appropriately setting the positions of the end points of the reinforcement material and the carcass layers, thereby solving the problem in the related art that stress is concentrated due to a small section height of low-series pneumatic tires and a severe rigidity change at the end point of a steel reinforcement material, so that it is difficult to set the position of the end of the steel reinforcement material. Accordingly, the present invention enables easy manufacturing of a low-series pneumatic tire with a reinforcement material. Further, it was found that the present invention improves durability of a pneumatic tire by enabling application of a reinforcement material to a low-series pneumatic tire, minimizes a trade-off effect in fuel efficiency to weight, and improve performance such as riding comfort.

The pneumatic tire according to an embodiment of the present invention provides an effect that it is possible to easily apply a reinforcement material to low-series tires with a low section height by making it easy to secure a spacing distance of end points of bead filler/carcass/steel reinforcement material by increasing the degree of freedom in design of bead filler/carcass/steel reinforcement material.

While the technical spirit of the present invention was described in detail through embodiments, it should be noted that the embodiments is for describing, not limiting, the present invention. Further, it should be noted that the present invention may be achieved in various ways by those skilled in the art without departing from the scope of the present invention. Therefore, the technical protective region of the present invention should be determined by the scope described in claims.

What is claimed is:
1. A pneumatic tire comprising:
a tread configured to come in contact with a road surface;
an inner liner;
a pair of beads, each bead of the pair of beads including a bead core, a bead filler, and a reinforcement material;
a carcass extending from one bead to the other bead of the pair of beads, the carcass including a pair of turn-up portions, each turn-up portion of the pair of turn-up portions surrounding each respective bead core;

a pair of side walls, each side wall of the pair of side walls extending from the tread to each respective bead and forming a shoulder; and a belt layer disposed between the carcass and the tread, wherein the reinforcement material is adjacent to its respective turn-up portion of the carcass, wherein an end point of the reinforcement material closest to the tread is spaced apart from an end point of the bead filler closest to the tread, wherein the carcass includes a first carcass layer and a second carcass layer, the first carcass layer is closer to a wheel than the second carcass layer, the second carcass layer is closer to the belt layer than the first carcass layer, and the second carcass layer has the pair of turn-up portions, and wherein an end point of the first carcass layer is positioned underneath a bottom surface of each respective bead core, and an end point of each turn-up portion of the second carcass layer is positioned in a radial direction of the tire that is within a side surface of each respective bead core.

2. The pneumatic tire of claim 1, wherein an end point of the reinforcement material closest to the wheel is positioned adjacent to the side surface of each respective bead core.

3. The pneumatic tire of claim 1, wherein the reinforcement material includes one or more steel wires configured to be bent in a temperature range of 15° C. to 45° C.

4. The pneumatic tire of claim 1, wherein the end point of the reinforcement material closest to the tread is spaced 5 mm to 10 mm apart from the end point of the bead filler closest to the tread.

5. The pneumatic tire of claim 1, wherein the end point of each turn-up portion of the second carcass layer is spaced 5 mm to 7 mm apart from the reinforcement material.

* * * * *